(12) United States Patent
Shimada et al.

(10) Patent No.: US 10,468,186 B2
(45) Date of Patent: Nov. 5, 2019

(54) PEROVSKITE CERAMIC COMPOSITION, COMBINED COMPOSITION CONTAINING PEROVSKITE CERAMIC COMPOSITION, METHOD FOR MANUFACTURING PEROVSKITE CERAMIC COMPOSITION, AND METHOD FOR MANUFACTURING MULTILAYER CERAMIC CAPACITOR

(71) Applicant: Murata Manufacturing Co., Ltd., Nagaokakyo-shi, Kyoto-fu (JP)

(72) Inventors: Kohei Shimada, Nagaokakyo (JP); Katsuya Ishida, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 232 days.

(21) Appl. No.: 15/378,321

(22) Filed: Dec. 14, 2016

(65) Prior Publication Data

US 2017/0178808 A1    Jun. 22, 2017

(30) Foreign Application Priority Data

Dec. 17, 2015   (JP) .................... 2015-246400

(51) Int. Cl.
*C04B 35/468* (2006.01)
*H01G 4/12* (2006.01)
(Continued)

(52) U.S. Cl.
CPC ....... *H01G 4/1227* (2013.01); *C04B 35/4682* (2013.01); *C04B 35/64* (2013.01); *H01G 4/005* (2013.01); *H01G 4/248* (2013.01); *H01G 4/30* (2013.01); *H01G 4/308* (2013.01); *C04B 2235/3206* (2013.01); *C04B 2235/3208* (2013.01); *C04B 2235/3215* (2013.01); *C04B 2235/3224* (2013.01); *C04B 2235/3236* (2013.01); *C04B 2235/3244* (2013.01); *C04B 2235/3262* (2013.01); *C04B 2235/3293* (2013.01); *C04B 2235/3418* (2013.01); *C04B 2235/3436* (2013.01); *C04B 2235/6584* (2013.01); *C04B 2235/768* (2013.01); *C04B 2235/79* (2013.01); *C04B 2235/81* (2013.01); *H01G 4/008* (2013.01); *H01G 4/232* (2013.01)

(58) Field of Classification Search
CPC .. C04B 35/468; C04B 35/4682; H01G 4/1227
See application file for complete search history.

(56) References Cited

U.S. PATENT DOCUMENTS 5,310,709 A     5/1994  Wada et al.
2009/0128989 A1*  5/2009  Suzuki ............... C01G 23/002
                                                361/321.4
(Continued)

FOREIGN PATENT DOCUMENTS

JP    H04260659 A    9/1992
JP    H05238820 A    9/1993
(Continued)

*Primary Examiner* — Karl E Group
(74) *Attorney, Agent, or Firm* — Arent Fox LLP

(57) ABSTRACT

A perovskite ceramic composition that contains Sn, Ba, and Ti, and where the Sn content is within a range of about 0.001 parts by mol≤Sn≤about 0.999 parts by mole with respect to 100 parts by mole of the Ti. The perovskite ceramic composition can be used in a composition that further includes a rare earth element R, Mn, and Si, and optionally Mg, where proportions of the R, the Mn, the Si, and the optional Mg, satisfy R: 0<R≤about 10 parts by mole, Mn: 0<Mn≤about 5 parts by mole, Si: 0<Si≤about 5 parts by mole Mg: 0<Mg≤about 5 parts by mole with respect to 100 parts by mole of Ti.

15 Claims, 1 Drawing Sheet

(51) Int. Cl.
  *C04B 35/64* (2006.01)
  *H01G 4/248* (2006.01)
  *H01G 4/30* (2006.01)
  *H01G 4/005* (2006.01)
  H01G 4/008 (2006.01)
  H01G 4/232 (2006.01)

(56) References Cited

U.S. PATENT DOCUMENTS

| | | | | |
|---|---|---|---|---|
| 2010/0035749 | A1* | 2/2010 | Choi | C04B 35/4682 501/138 |
| 2011/0122541 | A1* | 5/2011 | Nakamura | C04B 35/4682 361/321.4 |
| 2013/0278681 | A1* | 10/2013 | Saito | H01L 41/1871 347/68 |
| 2014/0268492 | A1* | 9/2014 | Jeong | H01G 4/1227 361/321.4 |
| 2015/0015121 | A1* | 1/2015 | Watanabe | B41J 2/14233 310/365 |
| 2015/0295160 | A1* | 10/2015 | Oshima | B32B 18/00 347/68 |
| 2015/0295161 | A1* | 10/2015 | Uebayashi | B32B 18/00 347/68 |

FOREIGN PATENT DOCUMENTS

| | | |
|---|---|---|
| JP | H09206305 A | 8/1997 |
| JP | 2007169088 A | 7/2007 |
| JP | 2013227196 A | 11/2013 |
| KR | 1020070050973 A | 5/2007 |
| WO | WO 2005075377 A1 | 8/2005 |

\* cited by examiner

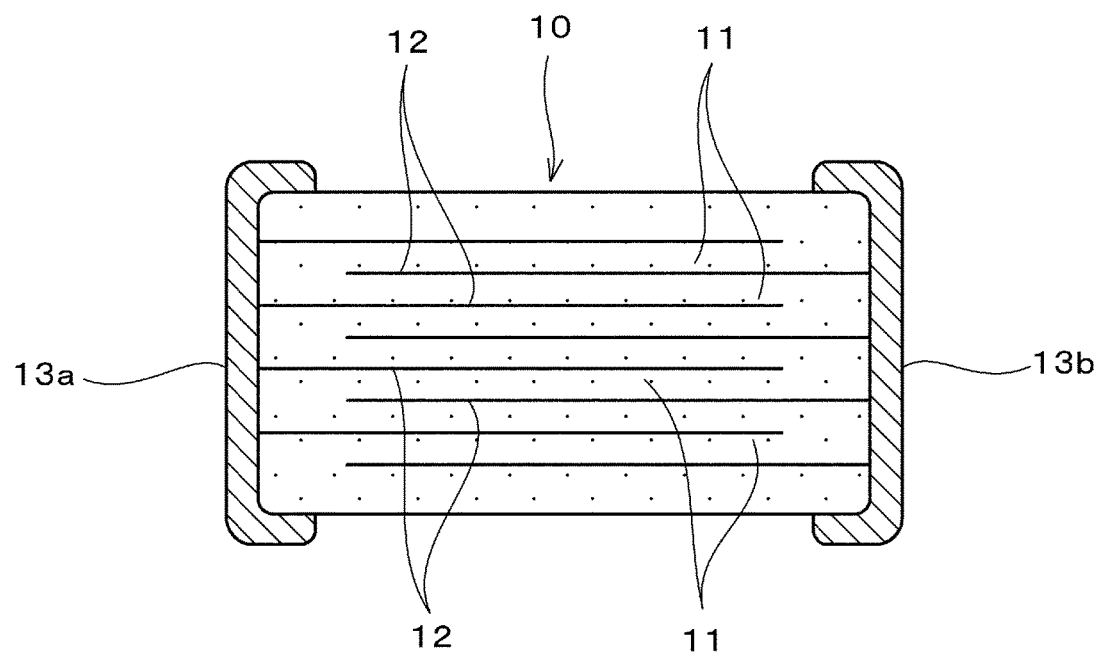

PEROVSKITE CERAMIC COMPOSITION, COMBINED COMPOSITION CONTAINING PEROVSKITE CERAMIC COMPOSITION, METHOD FOR MANUFACTURING PEROVSKITE CERAMIC COMPOSITION, AND METHOD FOR MANUFACTURING MULTILAYER CERAMIC CAPACITOR

CROSS REFERENCE TO RELATED APPLICATIONS

The present application claims priority to Japanese Patent Application No. 2015-246400, filed Dec. 17, 2015, the entire contents of which are incorporated herein by reference.

BACKGROUND OF THE INVENTION

Field of the Invention

The present invention relates to a perovskite ceramic composition, a combined composition containing the perovskite ceramic composition, a method for manufacturing the perovskite ceramic composition, and a method for manufacturing a multilayer ceramic capacitor.

Description of the Related Art

In recent years, small multilayer ceramic capacitors capable of having large capacitances have been widely used.

The multilayer ceramic capacitor has a structure in which, for example, a pair of outer electrodes are disposed on both end surfaces of a multilayer body produced by stacking inner electrode layers with ceramic layers serving as dielectric layers interposed therebetween, that is, a capacitor element, so as to be electrically connected to the inner electrode layers alternately arranged so as to be exposed at opposite end surfaces.

In such multilayer ceramic capacitors, various dielectric ceramic compositions having high dielectric constants, e.g., barium titanate based perovskite ceramic compositions, have been widely used as materials constituting the ceramic layers serving as the dielectric layers.

Regarding such dielectric ceramic compositions, for example, Japanese Unexamined Patent Application Publication No. 2013-227196 proposes a perovskite dielectric ceramic composition containing barium titanate serving as a primary component and at least three types of rare earth elements including Eu, wherein a first rare earth element R1 is at least one selected from the group consisting of Sc, Er, Tm, Yb, and Lu, and a second rare earth element R2 is at least one selected from the group consisting of Y, Dy, Ho, Tb, and Gd.

According to Japanese Unexamined Patent Application Publication No. 2013-227196, the dielectric ceramic composition exhibits small changes in electrostatic capacitance in a wide temperature range of −55° C. to 150° C., high insulation resistance at a high temperature of about 150° C., and an excellent high-temperature load life.

However, a multilayer ceramic capacitor produced using the above-described dielectric ceramic composition in the related art has not been able to always sufficiently satisfy the requirement for high reliability in severe environments.

SUMMARY OF THE INVENTION

The present invention solves the above-described problems, and it is an object to provide a perovskite ceramic composition suitable for producing, for example, a multilayer ceramic capacitor exhibiting an excellent high-temperature load life and high reliability when being used as a material for forming a dielectric layer of the multilayer ceramic capacitor, a combined composition containing the same, a method for manufacturing the perovskite ceramic composition, and a method for manufacturing a multilayer ceramic capacitor.

In order to solve the above-described problems, a perovskite ceramic composition according to preferred embodiments of the present invention contains Sn, Ba, and Ti, wherein the Sn content is within the range of about 0.001 parts by mol≤Sn≤about 0.999 parts by mole with respect to 100 parts by mole of Ti. Consequently, in the case where the perovskite ceramic composition serves as, for example, a dielectric material and is used for a multilayer ceramic electronic component, e.g., a multilayer ceramic capacitor, a multilayer ceramic electronic component exhibiting high reliability can be provided.

A combined composition according to preferred embodiments of the present invention includes (a) a perovskite ceramic composition according to preferred embodiments of the present invention and (b) a rare earth element R compound, a Mn compound, and a Si compound, wherein the proportions of rare earth element R, Mn, and Si contained in the combined composition satisfy R: $0 < R \leq$ about 10 parts by mole
Mn: $0 < Mn \leq$ about 5 parts by mole
Si: $0 < Si \leq$ about 5 parts by mole
with respect to 100 parts by mole of Ti.

Consequently, a highly useful combined composition can be provided, where the characteristics can be controlled by containing additional components, that is, a rare earth element R compound, a Mn compound, and a Si compound in the case where the combined composition is used as a dielectric material.

Another combined composition according to preferred embodiments of the present invention includes (a) a perovskite ceramic composition according to preferred embodiments of the present invention and (b) a rare earth element R compound, a Mn compound, a Si compound, and a Mg compound, wherein the proportions of rare earth element R, Mn, Si, and Mg contained in the combined composition satisfy R: $0 < R \leq$ about 10 parts by mole
Mn: $0 < Mn \leq$ about 5 parts by mole
Si: $0 < Si \leq$ about 5 parts by mole
Mg: $0 < Mg \leq$ about 5 parts by mole
with respect to 100 parts by mole of Ti.

Consequently, a highly useful combined composition can be provided, where the characteristics can be controlled by containing additional components, that is, a rare earth element R compound, a Mn compound, a Si compound, and a Mg compound in the case where the perovskite ceramic composition is used as a dielectric material.

A method for manufacturing a perovskite ceramic composition, according to preferred embodiments of the present invention, includes the step of synthesizing a perovskite ceramic composition containing Sn, Ba, and Ti, where the Sn content is within the range of about 0.001 parts by mol≤Sn≤about 0.999 parts by mole with respect to 100 parts by mole of Ti, by mixing and firing a Sn compound, a Ba compound, and a Ti compound. Consequently, a perovskite ceramic composition, in which uniformly dispersed Sn is present, can be obtained.

A method for manufacturing a multilayer ceramic capacitor, according to preferred embodiments of the present invention, includes the steps of preparing a ceramic slurry by using the perovskite ceramic composition according to preferred embodiments of the present invention, forming ceramic green sheets from the ceramic slurry, forming an unfired multilayer body, in which the ceramic green sheets and inner electrode layers are stacked, by stacking the ceramic green sheets and the inner electrode layers, and firing the unfired multilayer body so as to obtain a multilayer body in which the inner electrode layers are arranged between dielectric layers. Consequently, a multilayer ceramic capacitor exhibiting a low fraction defective in a high-temperature loading test and excellent reliability can be obtained.

Another method for manufacturing a multilayer ceramic capacitor, according to preferred embodiments of the present invention, includes the steps of preparing a ceramic slurry by using the above-described combined composition according to preferred embodiments of the present invention, forming ceramic green sheets from the ceramic slurry, forming an unfired multilayer body, in which the ceramic green sheets and inner electrode layers are stacked, by stacking the ceramic green sheets and the inner electrode layers, and firing the unfired multilayer body so as to obtain a multilayer body in which the inner electrode layers are arranged between dielectric layers. Consequently, a multilayer ceramic capacitor exhibiting a low fraction defective in a high-temperature loading test and excellent reliability can be obtained.

Another method for manufacturing a multilayer ceramic capacitor, according to preferred embodiments of the present invention, includes the steps of preparing a ceramic slurry by using the another combined composition according to preferred embodiments of the present invention, forming ceramic green sheets from the ceramic slurry, forming an unfired multilayer body, in which the ceramic green sheets and inner electrode layers are stacked, by stacking the ceramic green sheets and the inner electrode layers, and firing the unfired multilayer body so as to obtain a multilayer body in which the inner electrode layers are arranged between dielectric layers.

Other features, elements, characteristics and advantages of the present invention will become more apparent from the following detailed description of preferred embodiments of the present invention with reference to the attached drawing.

BRIEF DESCRIPTION OF THE DRAWING

The FIGURE is a sectional view showing the configuration of a multilayer ceramic capacitor according to an embodiment of the present invention.

DESCRIPTION OF THE PREFERRED EMBODIMENTS

The features of the present invention will be described below in detail with reference to the embodiments according to the present invention.

Embodiments

A. Production of Ceramic Composition (Base Material)

Initially, $BaCO_3$, $TiO_2$, and $SiO_2$ were prepared as starting raw materials, and were weighed in a ratio of 100 parts by mole of $TiO_2$ and 0 to 1.000 parts by mole of $SnO_2$ with respect to 100 parts by mole of $BaCO_3$ (refer to Table 1).

Subsequently, the weighed starting raw materials were mixed in a ball mill by using YSZ balls as agitation media. The resulting mixture was heat-treated at 1,100° C. so as to obtain ceramic compositions (base materials) of Examples 1 to 3 and Comparative examples 1 and 2, that is, Sn-containing barium titanate, shown in Table 1. In this regard, the base material of Comparative example 1 was a base material not containing $SnO_2$.

Regarding Comparative example 3, the method for adding $SiO_2$ was different from other examples and comparative examples, and after firing, $SiO_2$ was added together with other additional components described later, that is, $SiO_2$ was added after firing.

In Examples 1 to 3 and Comparative examples 1 to 3, $BaCO_3$ was set to be 100 parts by mole with respect to 100 parts by mole of Ti. Regarding Comparative example 4, the raw materials constituting the A site of the perovskite composite oxide $ABO_3$ was set to be 99.5 parts by mole of $BaCO_3$ and 0.5 parts by mole of $CaCO_3$, and 0.500 parts by mole of $SnO_2$ was further added before firing. The manufacturing method was the same as that in the cases of Examples 1 to 3. In Comparative example 4, Ca constituting the A site was also introduced by so-called addition before firing.

It was ascertained by XRD analysis that the resulting base materials of Examples 1 to 3 and Comparative examples 1 to 4 shown in Table 1 had a single-phase perovskite structure.

It was ascertained by ICP emission spectroscopy that each of the thus produced base materials was substantially the same as the preparation composition shown in Table 1.

Predetermined additional components were weighed and added to the thus produced base materials of Examples 1 to 3 and Comparative examples 1 to 4 at the predetermined compound ratio, and mixing and drying were performed in a ball mill by using YSZ balls as agitation media so as to produce combined compositions serving as dielectric raw material compounds.

Here, combined compositions, in which predetermined amounts of $Dy_2O_3$, $MnCO_3$, $SiO_2$, and MgO were combined as additional components, were produced.

The combined composition serving as the ceramic raw material was subjected to ICP emission spectroscopy and, as a result, it was ascertained that the amounts of Dy, Mn, Si, and Mg were Dy: 2.5 parts by mole, Mn: 0.4 parts by mole, Si: 1.5 parts by mole, and Mg: 1.0 parts by mole, respectively, with respect to Ti: 100 parts by mole.

Regarding Comparative example 3, as shown in Table 1, 0.500 parts by mole of $SnO_2$ was added in the step of adding the additional components, that is, was added after firing so as to establish a predetermined composition.

In the present embodiment, the base material was produced by employing a solid-phase synthesis method and a heat treatment was performed at about 1,100° C. so as to adjust the average particle diameter to about 250 nm. However, Sn-containing barium titanate serving as the base material can also be produced by employing a hydrothermal synthesis method, a hydrolysis method, or the like including the use of appropriate Sn raw material, Ba raw material, and Ti raw material.

The raw material for forming Sn-containing barium titanate and the compound form of the additional component are not limited to an oxide or a carbonate but may be a chloride, a metal organic compound, or the like.

The composition of barium titanate serving as a primary component may be a stoichiometric composition or be shifted from the stoichiometric composition to some extent. The molar ratio of the A site component to the B site component is usually preferably about 0.980 to about 1.020.

It is ascertained that there is no deterioration in characteristics even if up to about 1 part by mole in a total amount of Zr and Hf are contained with respect to 100 parts by mole of Ti.

In the case where a rare earth element R, Mn, and Si are contained and Mg is not contained, the preferable ranges of the contents are 0<R≤about 10 parts by mole, 0<Mn≤about 5 parts by mole, and 0<Si≤about 5 parts by mole with respect to 100 parts by mole of Ti.

More preferably, the contents are about 0.1≤R≤about 3 parts by mole, about 0.1≤Mn≤about 1 part by mole, and about 0.1≤Si≤about 3 parts by mole with respect to 100 parts by mole of Ti.

Further preferably, the contents are about 0.5≤R≤about 1.5 parts by mole, about 0.3≤Mn≤about 0.5 parts by mole, and about 1≤Si≤about 2 parts by mole with respect to 100 parts by mole of Ti.

In the case where a rare earth element R, Mn, Si, and Mg are contained, the preferable ranges of the contents are 0<R≤about 10 parts by mole, 0<Mn≤about 5 parts by mole, 0<Si≤about 5 parts by mole, and 0<Mg≤about 5 parts by mole with respect to 100 parts by mole of Ti.

More preferably, the contents are about 0.1≤R≤about 3 parts by mole, about 0.1≤Mn≤about 1 part by mole, about 0.1≤Si≤about 3 parts by mole, and about 0.05≤Mg≤about 2 parts by mole with respect to 100 parts by mole of Ti.

Further preferably, the contents are about 0.5≤R≤about 1.5 parts by mole, about 0.3≤Mn≤about 0.5 parts by mole, about 1≤Si≤about 2 parts by mole, and about 0.1≤Mg≤about 1 part by mole with respect to 100 parts by mole of Ti.

In the case of the use as a dielectric material for a multilayer ceramic capacitor in which the primary component of an inner electrode layer is Ni, the content of Mg is preferably 0≤Mg≤about 0.4 parts by mole with respect to 100 parts by mole of Ti. If the Mg content is large, Ni in the inner electrode layer easily diffuses into a dielectric layer and the risks of generation of a defect in the inner electrode layer and reduction in coverage increase.

B. Production of Multilayer Ceramic Capacitor

A combined composition was prepared by combining $Dy_2O_3$, $MnCO_3$, $SiO_2$, and MgO serving as additional components into the above-described base material, and a polyvinylbutyral binder, a plasticizer, and ethanol serving as an organic solvent were added to the resulting combined composition. These were wet-mixed in a ball mill by using YSZ balls as agitation media so as to produce a ceramic slurry. In this regard, as described above, Comparative example 1 did not contain Sn, and in Comparative example 3, Sn was added after firing.

Subsequently, the resulting ceramic slurry was subjected to sheet forming by employing a lip method so as to produce substantially rectangular ceramic green sheets having a thickness of about 3.0 μm.

The above-described ceramic green sheets were screen-printed with a conductive paste containing Ni so as to form conductive paste films serving as inner electrode layers.

A plurality of ceramic green sheets provided with the conductive paste films were stacked such that the sides, to which the conductive paste films extended, were staggered so as to produce an unfired multilayer body serving as a capacitor main body after being fired.

The resulting unfired multilayer body was heated in a $N_2$ atmosphere at a temperature of 350° C. for 3 hours so as to burn the binder. Thereafter, firing was performed in a reducing atmosphere composed of $H_2$—$N_2$—$H_2O$ gas having an oxygen partial pressure of $10^{-11}$ MPa at 1,200° C. for 2 hours so as to produce a sintered multilayer body.

The resulting multilayer body was dissolved and was subjected to ICP emission spectrometry. As a result, it was ascertained that Dy was 2.5 parts by mole, Mn was 0.4 parts by mole, Si was 1.5 parts by mole, and Mg was 1.0 parts by mole except Ni, which was the component of the inner electrode layer, with respect to 100 parts by mole of Ti.

The contents of the rare earth element (Dy), Mn, Si, and Mg, which are additional components, are not limited to this example and can be appropriately adjusted within the scope of the present invention.

In this regard, it was ascertained that about 0.02 parts by mole of Zr with respect to 100 parts by mole of Ti was mixed from the YSZ balls used during mixing.

Then, the dielectric ceramic layer constituting the multilayer body was subjected to the XRD structure analysis. As a result, it was ascertained that the primary component had a barium titanate based perovskite structure.

Subsequently, both end surfaces of the capacitor element, which was the multilayer body, were coated with a Cu paste containing a glass frit, and baking was performed in a $N_2$ atmosphere at a temperature of 800° C. so as to form outer electrodes electrically connected to the inner electrodes. In this manner, the multilayer ceramic capacitor shown in the FIGURE was produced.

The resulting multilayer ceramic capacitor had a structure in which a pair of outer electrodes 13a and 13b were disposed on both end surfaces of a multilayer body (capacitor element) 10 produced by stacking inner electrode layers 12 with ceramic layers (dielectric ceramic layers) 11 serving as dielectric layers interposed therebetween so as to be electrically connected to the inner electrode layers 12 alternately arranged so as to be exposed at opposite end surfaces.

The external shape dimensions of the resulting multilayer ceramic capacitor were width: 1.25 mm, length: 2.0 mm, and thickness: 1.0 mm, and the average thickness of the dielectric ceramic layers 11 interposed between the inner electrode layers was 2.0 μm.

The total number of effective dielectric ceramic layers was 10, the opposite electrode area per layer was 1.6 $mm^2$, and the average thickness of the inner electrode layers was 1.0 μm.

C. Evaluation of Characteristics

Next, the base materials of Examples 1 to 3 and Comparative examples 1 to 4 and the multilayer ceramic capacitors produced by using the combined compositions, in which predetermined additional components were combined into the above-described base materials, as a dielectric material were evaluated.

(1) Analysis of Particle Internal Composition

The base material and a product of the multilayer ceramic capacitor produced by using the base material were used as specimens. A resin arranged surrounding each of the specimens was cured, and the particle cross section of each of the above-described base materials and the cross section of the crystal grain in the dielectric ceramic layer constituting each of the multilayer ceramic capacitors were exposed by a pre-treatment with a microtome.

The composition analysis of the central portion of the particle of each of the base materials and the central portion of the crystal grain in the dielectric ceramic layer constituting each of the multilayer ceramic capacitors was performed by point analysis using STEM-EDS.

From the analytical results, it was ascertained that Sn was present in the central portion of the particle of each of the base materials and the central portion of the crystal grain in the dielectric ceramic layer constituting each of the multilayer ceramic capacitors of Examples 1 to 3 and Comparative examples 2 and 4.

Meanwhile, Sn was detected in neither the central portion of the particle of each of the base materials of Comparative examples 1 and 3 nor the central portion of the crystal grain in the dielectric ceramic layer constituting each of the multilayer ceramic capacitors.

Regarding Comparative example 4, it was ascertained that Ca was present in the central portion of the particle of the base material and the central portion of the crystal grain in the dielectric ceramic layer of the multilayer ceramic capacitor produced using the base material.

The analytical method for analyzing the composition inside the particle is not limited to STEM-EDS, and the analysis can be performed by a method of, for example, laser abrasion ICP.

(2) Measurement of Life Characteristics by High-Temperature Loading Test

The multilayer ceramic capacitors according to Examples 1 to 3 and Comparative examples 1 to 4 were subjected to the high-temperature loading test by the method described below and the characteristics were evaluated.

Changes in insulation resistance over time of 100 multilayer ceramic capacitors (specimens) of each of the above-described multilayer ceramic capacitor were observed by applying a direct current voltage of 16 V at 125° C. Regarding each multilayer ceramic capacitor, the point in time when the value of the insulation resistance became 0.1 MΩ or less was considered to be the time of occurrence of failure.

The number of defects, that is, the number of specimens in which failure occurred, 2,000 hours after the start of the test was examined and was taken as the index of the high-temperature load life. Table 1 shows the number of occurrences of failure in the high-temperature loading test. The case where the number of occurrences of defect was 0 was rated as "good", and the case where the number of occurrences of defect was 1 or more was rated as "defective".

The Sn content is preferably about 0.001 parts by mole Sn about 0.998 parts by mole with respect to 100 parts by mole of Ti, more preferably about 0.200 parts by mole Sn about 0.800 parts by mole, and further preferably about 0.300 parts by mole Sn about 0.700 parts by mole.

On the other hand, regarding Comparative example 1, the number of occurrences of defects in the high-temperature load life was 5 and this case was rated as "defective". The reason for this is that it is estimated that Sn was not contained in Comparative example 1 and, thereby, variations occurred in the solid solution state of the additional components and degradation of insulation of the capacitor element could not be sufficiently suppressed.

Regarding Comparative example 2, the number of occurrences of defects in the high-temperature load life was 6 and this case was rated as "defective". The reason for this is that it is estimated that the Sn content was 1.000 parts by mole with respect to 100 parts by mole of Ti and exceeded the scope of the present invention, and thereby, an effect of suppressing oxygen vacancy migration was reduced and degradation of insulation of the capacitor element occurred.

Regarding Comparative example 3, the number of occurrences of defects in the high-temperature load life was 5 and this case was rated as "defective". The reason for this is that it is estimated that in the case of Comparative example 3, Sn was added after firing and the dispersibility was poor, and thereby, variations occurred in the solid solution state of the additional components thereafter, and degradation of insulation of the capacitor element occurred.

Regarding Comparative example 4, the number of occurrences of defects in the high-temperature load life was 5 and this case was rated as "defective". The reason for this is that it is estimated that the A site of the perovskite compound oxide $ABO_3$ included not only Ba but also Ca and, thereby, the lattice constant decreased, even when Sn was added before firing, added Sn did not sufficiently enter the perovskite structure lattice, and a predetermined effect was not exerted.

Regarding Comparative example 4, the molar ratio of Ba:Ca was set to be 99:1. However, it was ascertained that

TABLE 1

| | Base material species | Addition form of Sn | Sn content (parts by mole) | Number of occurrences of defect in high-temperature load life |
|---|---|---|---|---|
| Example 1 | barium titanate | added before firing | 0.001 | 0 |
| Example 2 | barium titanate | added before firing | 0.500 | 0 |
| Example 3 | barium titanate | added before firing | 0.999 | 0 |
| Comparative example 1 | barium titanate | none | 0 | 5 |
| Comparative example 2 | barium titanate | added before firing | 1.000 | 6 |
| Comparative example 3 | barium titanate | added after firing | 0.500 | 5 |
| Comparative example 4 | barium calcium titanate | added before firing | 0.500 | 5 |

As shown in Table 1, regarding each of Examples 1 to 3, the number of occurrences of defect in the high-temperature load life was 0. The reason for this is that it is estimated that the base material contained Sn in the range of about 0.001 parts by mole≤Sn≤about 0.999 parts by mole with respect to 100 parts by mole of Ti and, thereby, the additional components were able to form a homogeneous solid solution with the base material and degradation of insulation of the multilayer body constituting the multilayer ceramic capacitor, that is, the capacitor element, was able to be suppressed.

in the case where the molar ratio of Ba:Ca was set to be 99.6:0.4 and the other conditions were not changed, the number of occurrences of defects in the high-temperature load life was 0. Therefore, the multilayer ceramic capacitor is considered to be possible to use while the molar ratio of Ba/Ca is set to be about 99.6/0.4=249 or more depending on the condition.

However, if Ca or Sr is present in the A site of the perovskite compound oxide $ABO_3$, the electrostatic capacitance of the multilayer ceramic capacitor tends to be reduced when a bias is applied. Therefore, it is usually preferable that neither Ca nor Sr be present in the central portion of a base material particle and the central portion of a crystal grain of the multilayer ceramic capacitor.

In the present embodiment, the combined composition, in which the additional components are added to Sn-containing barium titanate serving as the base material of the present invention, is used as the material for forming the dielectric layer of the multilayer ceramic capacitor, but Sn-containing barium titanate, which is a base member not containing the rare earth element R, Mn, Si, Mg, or the like serving as the additional component can also be used as the material for forming the dielectric layer.

In the present embodiment, the rare earth element R, Mn, Si, and Mg are combined as the additional components. However, it can also be configured such that Mg is not combined but three components of the rare earth element R, Mn, and Si are combined.

In the present embodiment, the case where the combined composition containing the perovskite ceramic composition according to the present invention is used as the dielectric layer of the multilayer ceramic capacitor is described as an example. The perovskite ceramic composition according to the present invention and the combined composition, in which the additional components are combined into the perovskite ceramic composition, can be applied to not only the multilayer ceramic capacitor but also the dielectric material in the case where other electronic components, e.g., an LC composite component are produced.

The present invention is not limited to the above-described embodiments with respect to other points.

While preferred embodiments of the invention have been described above, it is to be understood that variations and modifications will be apparent to those skilled in the art without departing from the scope and spirit of the invention. The scope of the invention, therefore, is to be determined solely by the following claims.

What is claimed is:

1. A perovskite ceramic composition comprising Sn, Ba, and Ti, wherein a content of the Sn is within a range of 0.200 parts by mol≤Sn≤0.800 parts by mole with respect to 100 parts by mole of the Ti.

2. The perovskite ceramic composition according to claim 1, wherein the content of the Sn is 0.300 parts by mole≤Sn≤0.700 parts by mole.

3. A composition comprising:
   (a) a perovskite ceramic composition according to claim 1; and
   (b) a rare earth element R, Mn, and Si,
   wherein, with respect to the 100 parts by mole of the Ti, proportions of the rare earth element R, the Mn, and the Si contained in the composition are:
   R: 0.1≤R≤3 parts by mole,
   Mn: 0.1≤Mn≤1 parts by mole,
   Si: 0.1≤Si≤3 parts by mole.

4. The composition according to claim 3, wherein
   0.5≤R≤1.5 parts by mole,
   0.3≤Mn≤0.5 parts by mole, and
   1≤Si≤2 parts by mole.

5. A composition comprising:
   (a) a perovskite ceramic composition according to claim 1; and
   (b) a rare earth element R, Mn, Si, and Mg,
   wherein, with respect to the 100 parts by mole of the Ti, proportions of the rare earth element R, the Mn, the Si, and the Mg contained in the composition are
   R: 0.1≤R≤3 parts by mole,
   Mn: 0.1≤Mn≤1 parts by mole,
   Si: 0.1≤Si≤3 parts by mole, and
   Mg: 0.05≤Mg≤2 parts by mole.

6. The composition according to claim 5, wherein
   0.5≤R≤1.5 parts by mole,
   0.3≤Mn≤0.5 parts by mole,
   1≤Si≤2 parts by mole, and
   0.1≤Mg≤1 part by mole.

7. A method for manufacturing a perovskite ceramic composition, the method comprising:
   mixing and firing a Sn compound, a Ba compound, and a Ti compound so as to synthesize a perovskite ceramic composition containing Sn, Ba, and Ti, where a content of the Sn is within a range of 0.200 parts by mol≤Sn≤0.800 parts by mole with respect to 100 parts by mole of the Ti.

8. The method for manufacturing a perovskite ceramic composition according to claim 7, wherein the content of the Sn is 0.300 parts by mole≤Sn≤0.700 parts by mole.

9. A method for manufacturing a multilayer ceramic capacitor, the method comprising:
   preparing a ceramic slurry by using a perovskite ceramic composition containing Sn, Ba, and Ti, where a content of the Sn is within a range of 0.200 parts by mol≤Sn≤0.800 parts by mole with respect to 100 parts by mole of the Ti;
   forming ceramic green sheets from the ceramic slurry;
   stacking the ceramic green sheets and inner electrode layers so as to form an unfired multilayer body; and
   firing the unfired multilayer body so as to obtain a multilayer body in which the inner electrode layers are arranged between dielectric layers.

10. The method for manufacturing a multilayer ceramic capacitor according to claim 9, wherein the content of the Sn is 0.300 parts by mole≤Sn≤0.700 parts by mole.

11. The method for manufacturing a multilayer ceramic capacitor according to claim 9, further comprising:
    adding a rare earth element R, Mn, and Si to the ceramic slurry, where, with respect to the 100 parts by mole of the Ti, proportions of the rare earth element R, the Mn, and the Si are
    R: 0<R≤10 parts by mole,
    Mn: 0<Mn≤5 parts by mole, and
    Si: 0<Si≤5 parts by mole.

12. The method for manufacturing a multilayer ceramic capacitor according to claim 11, wherein
    0.1≤R≤3 parts by mole,
    0.1≤Mn≤1 part by mole, and
    0.1≤Si≤3 parts by mole.

13. The method for manufacturing a multilayer ceramic capacitor according to claim 11, wherein
    0.5≤R≤1.5 parts by mole,
    0.3≤Mn≤0.5 parts by mole, and
    1≤Si≤2 parts by mole.

14. The method for manufacturing a multilayer ceramic capacitor according to claim 11, further comprising:
    adding Mg to the ceramic slurry, where, with respect to the 100 parts by mole of the Ti, a proportion of the Mg is Mg: 0<Mg 5 parts by mole.

15. The method for manufacturing a multilayer ceramic capacitor according to claim 14, wherein a primary component of the inner electrode layers is Ni, and the content of the Mg is 0≤Mg≤0.4 parts by mole.

* * * * *